No. 664,341. Patented Dec. 18, 1900.
G. W. TROMMLITZ & J. M. GIBBS.
GRIPPING CONNECTION FOR INFLATION VALVES.
(Application filed Mar. 15, 1900.)

(No Model.)

WITNESSES
INVENTORS
Geo. W. Trommlitz
Jas. Monroe Gibbs
BY
ATTORNEY.

THE NORRIS PETERS CO., PHOTO-LITHO., WASHINGTON, D. C.

UNITED STATES PATENT OFFICE.

GEORGE WILLIAM TROMMLITZ AND JAMES MONROE GIBBS, OF DENVER, COLORADO; SAID TROMMLITZ ASSIGNOR OF HIS RIGHT AND SAID GIBBS ASSIGNOR OF ONE-HALF OF HIS RIGHT TO CHARLES T. BROWN, OF SAME PLACE.

GRIPPING CONNECTION FOR INFLATION-VALVES.

SPECIFICATION forming part of Letters Patent No. 664,341, dated December 18, 1900.

Application filed March 15, 1900. Serial No. 8,805. (No model.)

*To all whom it may concern:*

Be it known that we, GEORGE WILLIAM TROMMLITZ and JAMES MONROE GIBBS, citizens of the United States of America, residing at Denver, in the county of Arapahoe and State of Colorado, have invented certain new and useful Improvements in Gripping Connections for Inflation-Valves; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to an improved device for making quick connection with inflation-valves. Heretofore, so far as we are aware, this connection has only been made by means of a screw-coupling, making the operation comparatively long and tedious.

Our object is to overcome this difficulty; and to this end the invention consists of the features hereinafter described and claimed, all of which will be fully understood by reference to the accompanying drawings, in which is illustrated an embodiment thereof.

Figure 1:
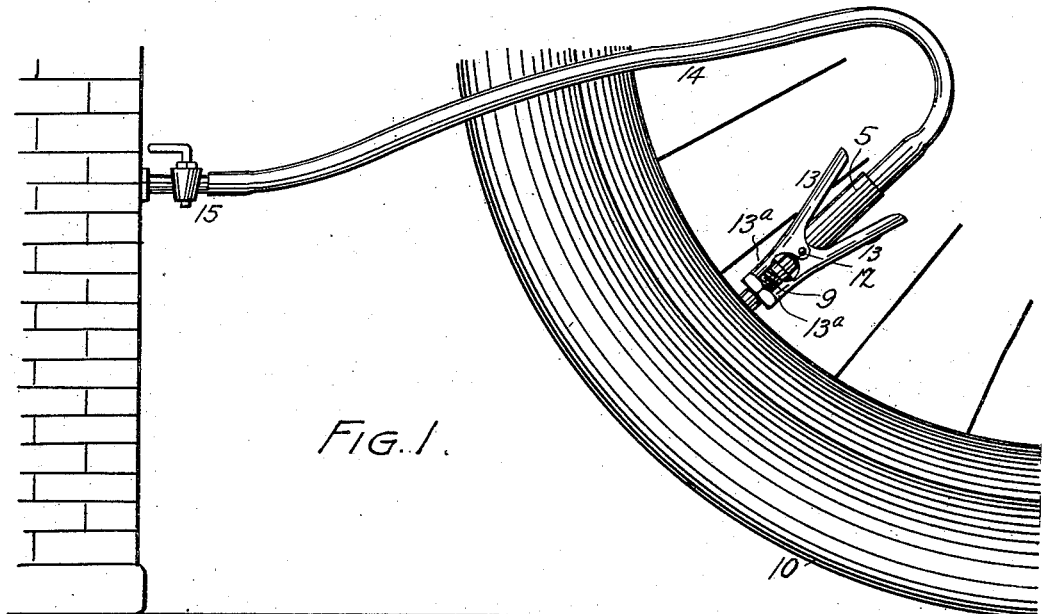
Figure 2:
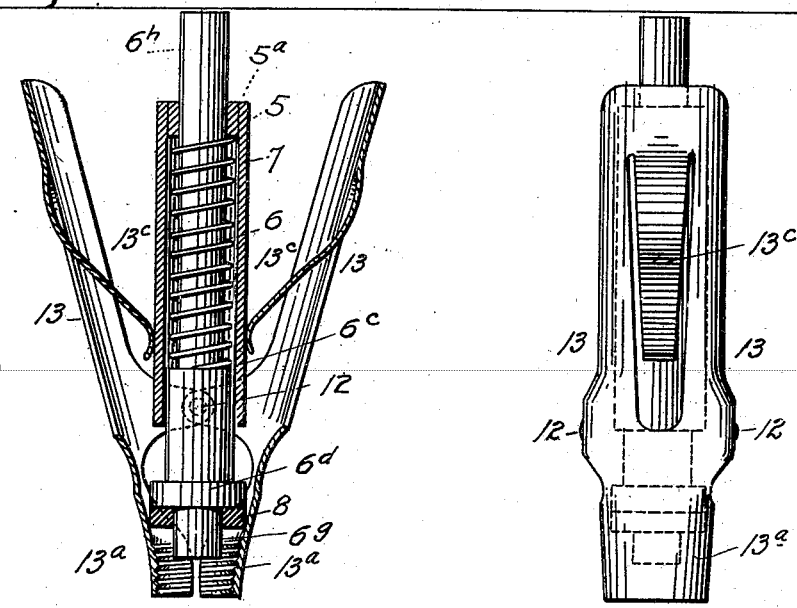
Figure 3:
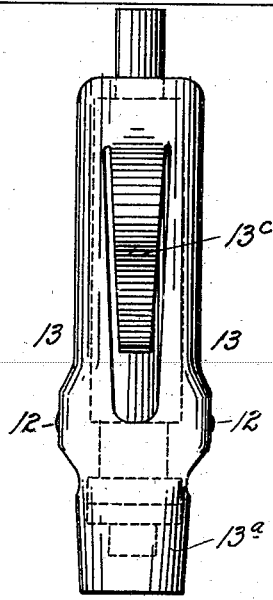

In the drawings, Figure 1 illustrates our improved device in use. Fig. 2 is a longitudinal section taken through the device shown in detail and on a larger scale. Fig. 3 is a side elevation of the same.

Similar reference characters indicating corresponding parts in the views, let the numeral 5 designate a tubular casing in which is located a hollow plunger 6. This plunger is enlarged at its forward extremity, as shown at $6^a$, forming a shoulder $6^c$, against which one extremity of a coil-spring 7 bears. The outer extremity of this spring engages an interior shoulder $5^a$, formed near the rear extremity of the tube 5. The plunger 6 protrudes from both extremities of the casing 5. The forward protruding part is provided with an exterior collar $6^d$, against which rests a packing-ring 8, composed of rubber or other suitable yielding material. This ring surrounds the nipple extremity $6^g$ of the plunger. The nipple $6^g$ enters the outer extremity of the casing 9 (see Fig. 1) of the inflation-valve mounted on the rim of the bicycle-wheel 10 or other wheel or device to be inflated.

Fulcrumed on the casing 5, as shown at 12, are two lever-like members 13, provided with interiorly-threaded coöperating jaws $13^a$, adapted to automatically grip the exteriorly-threaded extremity of the valve-casing 9 by virtue of two springs $13^c$, respectively connected with the members 13 and bearing against the casing 5 in the rear of the fulcrum 12. As shown in the drawings, the springs $13^c$ are integral with the members 13 and formed by cutting around an elongated portion of each member, leaving it intact at one extremity and pressing the parts inwardly sufficiently to engage the casing 5, whereby the jaws 13 of the members are normally held in the closed position. These jaws are curved to fit the cylindrical extremity of the valve-casing 9.

To the rear protruding extremity $6^h$ of the plunger 6 is attached the tube or air-conduit 14, connected with the nipple 15 of an air-supply source. This tube 14 may be connected with an air-pump (not shown) or with a source of compressed air, as may be desired.

To use our improved device, it is only necessary to press inwardly on the rear extremities of the members 13 until the jaws $13^a$ are sufficiently open to allow the outer extremity of the valve-casing 9 to pass between them. The nipple end $6^g$ of the tube 6 is then inserted in the open end of the valve-casing until the packing-ring 8 is pressed tightly against said casing, forming an air-tight joint. The jaws are then allowed to close on the valve-casing extremity, whereby the device is held securely in place.

When the device is applied, the spring 7 holds the plunger tightly against the end of the valve-casing and prevents the plunger from moving rearwardly in the casing 5.

Having thus described our invention, what we claim is—

1. A connection for inflation-valves, comprising spring-actuated, lever-like gripping-jaws, a support on which the jaws are fulcrumed, and a spring-held tubular plunger carried by the support, one end being fashioned to engage the extremity of the inflation-valve, and the other end being connected with an air-supply source.

2. The combination with the exteriorly-threaded extremity of the valve-casing, of a pair of spring-held gripping-jaws interiorly threaded to engage said casing, a support on which the jaws are mounted, and a spring-held tubular plunger located in said support.

3. The combination of a pair of lever-like gripping-jaws, a support upon which said jaws are fulcrumed, and a hollow plunger carried by said support and protruding between said jaws, the said plunger extremity being adapted to enter the open end of a valve-casing, and a packing-ring surrounding the extremity of the plunger to form an air-tight joint.

4. The combination of two coöperating, lever-like members, a tubular casing on which said members are fulcrumed, the members being provided with jaws at one extremity adapted to grip the casing of a valve, and arms at the opposite extremity, springs engaging said arms whereby the jaws are held normally closed, and a spring-held hollow plunger located in the tubular casing and protruding at both extremities.

5. The combination of a tubular casing, a plunger passing therethrough, a coil-spring located within the casing and surrounding the plunger, one extremity bearing against a shoulder on the casing and the other extremity against a shoulder on the plunger, and spring-actuated lever-like jaws fulcrumed on the tubular casing.

In testimony whereof we affix our signatures in presence of two witnesses.

GEORGE WILLIAM TROMMLITZ.
JAMES MONROE GIBBS.

Witnesses:
GRACE MYTINGER,
A. J. O'BRIEN.